Oct. 21, 1952 — T. E. CROCKETT — 2,614,579
FLOAT OPERATED VALVE
Filed June 6, 1950
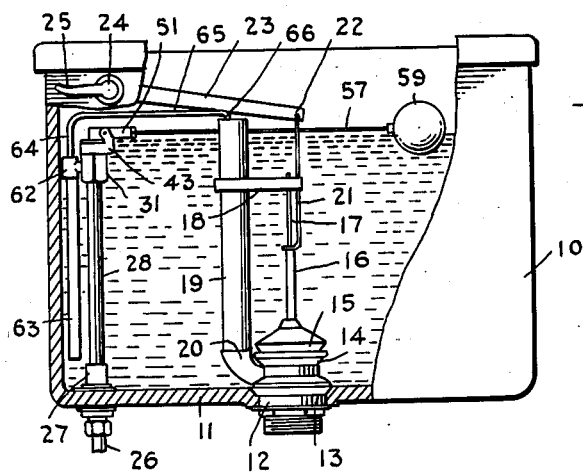
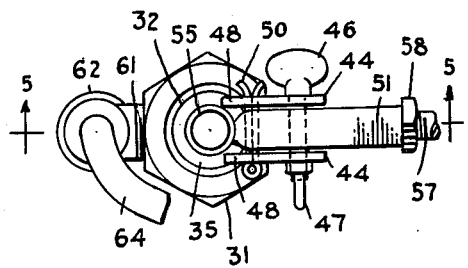
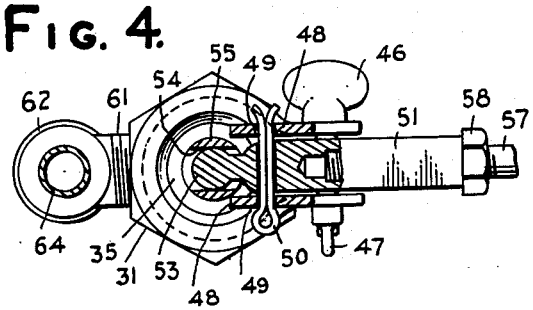
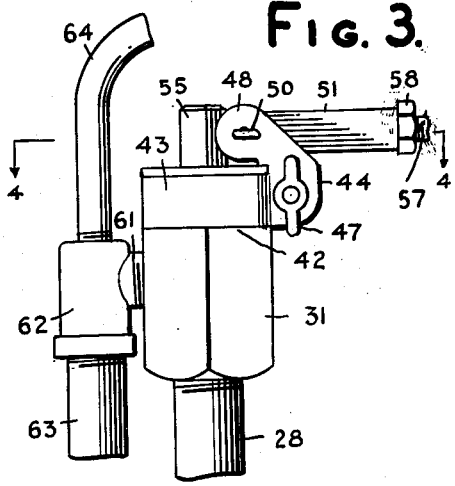
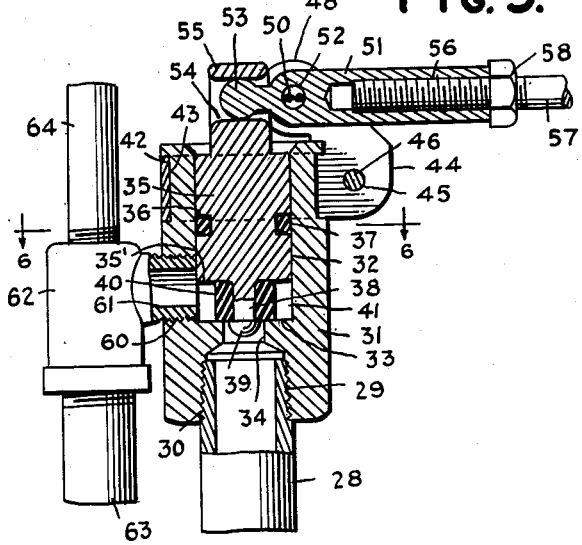
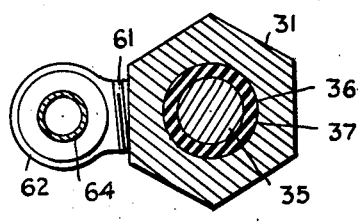
INVENTOR.
THOMAS E. CROCKETT
BY
ATTORNEY Patented Oct. 21, 1952

2,614,579

UNITED STATES PATENT OFFICE 2,614,579

FLOAT OPERATED VALVE

Thomas E. Crockett, Corpus Christi, Tex., assignor, by mesne assignments, to Crockett Valve Corporation, Los Angeles, Calif., a corporation of California Application June 6, 1950, Serial No. 166,423

1 Claim. (Cl. 137—444)

My invention relates to improvements in float operated valves.

A primary object of the invention is to provide an improved float operated valve for supplying water to the flush tank of a toilet.

A further object is to provide a valve of the above mentioned character which is highly simplified and compact in construction, durable, reliable and efficient in operation, and very cheap to manufacture.

A further object is to provide a valve of the above mentioned character which is very easy to assemble and disassemble, the design of the valve being such that its essential parts are well adapted for screw machine production, it being unnecessary to cast or forge any of the essential parts.

A still further object is to provide a valve of the above mentioned character which embodies a novel swivel joint between the float lever and valve body or casing.

Other objects and advantages of the invention will be apparent during the course of the following description.

In the accompanying drawings, forming a part of this application, and in which like numerals are employed to designate like parts throughout the same, Figure 1 is a side elevational view of a toilet flush tank equipped with a float valve embodying my invention, part in section, Figure 2 is a plan view of the float operated valve drawn on an enlarged scale, Figure 3 is a side elevation of the valve illustrated by Figure 2, Figure 4 is a horizontal section taken on line 4—4 of Figure 3, parts in elevation, Figure 5 is a longitudinal vertical section taken on line 5—5 of Figure 2, and, Figure 6 is a horizontal section taken on line 6—6 of Figure 5.

In the drawings, where for the purpose of illustration is shown a preferred embodiment of my invention, the numeral 10 designates a toilet flush tank of conventional construction, and provided in its bottom 11 with a discharge pipe or sleeve 12, secured in place by a coupling nut 13. Formed integral with the discharge sleeve 12 is an upwardly directed conical valve seat 14 for the usual conical flush valve element 15 of rubber or the like. The valve element 15 carries an upstanding vertical guide tube 16, slidably receiving a rigid vertical guide rod 17, rigidly held by a horizontal support arm 18, in turn rigidly secured to a vertical overflow pipe 19. The overflow pipe 19 is equipped at its bottom end with a tubular extension 20 leading into the discharge sleeve 12 below the valve seat 14. The extension 20 is permanently rigidly secured to the discharge sleeve 12, and preferably formed integral therewith.

A vertical pull or trip rod 21 has its lower end connected with the guide tube 16 and its upper end pivotally connected as at 22 with the free end of a vertically swingable lever 23, rigidly secured to a horizontal rock shaft 24, journaled in the forward side of the tank 10 and operated by an exterior hand lever 25.

A water inlet or supply pipe 26 leads into the bottom of the tank 10 near one side of the same and is connected by means of a suitable coupling 27 with a vertical inlet pipe extension 28 which extends to a point near and below the top of the tank 10, Figure 1. The coupling 27 serves to rigidly secure the pipe 28 to the tank bottom 11.

The upper end of the pipe 28 is screw-threaded as at 29, Figure 5, for engagement in a screw-threaded opening 30 formed in the bottom end of a valve body or casing 31, preferably formed of hexagon bar stock, or the like. The valve body 31 is vertically disposed, as shown, and supported by the upstanding vertical pipe 28. The valve body 31 is provided in its top with a main cylindrical bore 32 having a bottom forming an internal shoulder or flat valve seat 33 near and below the longitudinal center of the valve body. A central small bore or passage 34 leads from the bottom of the main bore 32 into the screw-threaded opening 30, so that the top of the pipe may communicate with the bore 32.

A cylindrical piston 35 is mounted within the main bore 32 for reciprocation, and provided with an annular groove 36, receiving an O ring seal 37 of rubber, "neoprene," or the like, the seal preventing the passage of water between the piston and main bore 32. The piston 35 is provided at its bottom end 35' with a central depending reduced extension 38, integral therewith, in turn provided at its bottom end with an enlarged head or button 39. The piston end 35' is spaced from the seat 33 at all times. A resilient cylindrical tubular valve element 40 of soft rubber or the like is mounted upon the reduced extension 38 between the head or button 39 and the bottom end 35' of the piston, Figure 5, and this valve element snugly engages the extension 38, the button 39 preventing its displacement from the piston. The outside diameter of the valve element 40 is substantially smaller than the diameter of the main bore 32, and an annular passage 41 is formed between the resilient valve element and main bore 32. The diameter of the resilient valve element 40 is greater than that of the bore or passage 34, so that the lower end of the valve element 40 may engage the flat valve seat 33 surrounding the bore 34 for sealing or closing off the flow of water from the pipe 28 into the passage 41. The button 39 is adapted to enter the passage 34, as shown.

The valve body 31 is provided near and below its upper end with a shallow cylindrical undercut or groove 42, receiving therein an annular split ring or band 43 having spaced radial extensions 44, provided with aligned apertures 45 for receiving a wing screw 46, carrying a winged nut 47. It is thus seen that the band 43 constitutes a clamp which may be adjusted or swiveled about the valve body 31 to any selected adjusted position, and clamped or locked in such adjusted position by means of the winged nut 47. The radial extensions 44 carry integral inclined upstanding support arms or extensions 48, disposed above the upper end of the valve body 31, and provided with aligned apertures 49 for receiving a cotter pin 50. A piston actuator or lever 51 is disposed between the support arms 48 and provided with a transverse opening 52, pivotally receiving the cotter pin 50. The actuator 51 has a ball head or extension 53, integral therewith and engaging within a transverse opening or bore 54 formed in a top reduced extension 55 of the piston 35. A universal joint is thus formed between the piston 35 and piston actuator 51, and the cotter pin 50 pivotally supports the piston actuator so that it may swing vertically between the upstanding spaced support arms 48. The piston actuator 51 is disposed substantially horizontally in use and provided in its outer end with a screw-threaded opening 56 forming a socket for the screw-threaded end of a float rod or stem 57, rigidly secured in place by means of a lock nut 58. The outer or free end of the rod 57 is equipped with the usual float 59, Figure 1.

Adjacent to the bottom of the main bore 32, the valve body 31 is provided in its side wall with a screw-threaded opening 60, receiving therein a screw-threaded nipple 61 of a reducing T 62. The screw-threaded opening 60 leads into the annular passage 41, so that the nipple 61 is in communication therewith. A depending vertical down flow pipe 63 has its upper end screw-threaded into the bottom of the T fitting 62, and the lower end of the pipe 63 terminates near and above the tank bottom 11. This arrangement provides for the silent flow of water from the pipe 28 into the bottom of the tank 10.

A tube 64 leads from the upper end of the T fitting 62, and has screw-threaded engagement therewith. This tube has a substantially horizontal portion 65, carrying a depending extension 66 leading into the top of the over flow pipe 19, Figure 1. The purpose of the tube 64 is to effect and maintain the usual water seal in the toilet bowl.

In operation, when the tank 10 is filled with water, Figure 1, the float 59 rises until the actuator 51 is substantially horizontal. The ball head 53 forces the piston 35 downwardly in the bore 32, and the lower end of the resilient valve element 40 engages the annular shoulder or seat 33 to block the flow of water from the inlet pipe 28 through the passage 34.

When the toilet is flushed by depressing the lever 25 to elevate the flush valve element 15, the float 59 is lowered and the ball head 53 swings upwardly about the cotter pin 50. This elevates the piston 35 and lifts the resilient valve element 40 from the seat 33. Water now flows from the pipe 28, through the passage or bore 34 and into the annular passage 41. It then flows through the nipple 61, T fitting 62 and downwardly through the pipe 63 to the bottom of the tank for filling the same. As the tank becomes filled, the float 59 is elevated for again closing the valve element 40 automatically.

The construction of the float operated valve is highly simplified, compact and durable. The radial position of the float 59 may be readily adjusted, due to the convenient swivel connection between the band or clamp 43 and valve casing 31. A minimum number of parts are employed, and these are all easy to machine. No castings are necessary, and there are no hidden or internal screws liable to loosen with use. The construction of the valve is such that it is very easy to assemble and disassemble during repairing, and in this connection, there are very few parts liable to wear to any great extent. I have found that the valve is substantially trouble-free, silent and long-lasting in use.

It is to be understood that the form of my invention herewith shown and described is to be taken as a preferred example of the same, and that various changes in the shape, size and arrangement of parts may be resorted to, without departing from the spirit of the invention or the scope of the subjoined claim.

Having thus described my invention, I claim:

A float operated valve for a toilet flush tank, comprising an upstanding water supply pipe arranged within the tank, an upstanding relatively short unitary valve casing mounted upon the upper end of the water supply pipe and having a longitudinal main cylindrical bore extending through its upper end and an internal shoulder at its lower end, said shoulder having an opening leading into the bore, said casing having its lower end provided with a screw-threaded recess for receiving the screw-threaded end of the upstanding water supply pipe, said casing being provided in its side with an outlet opening, said casing being provided adjacent to its upper end with an annular recess, a cylindrical piston slidably and rotatably mounted within said bore, an upper extension carried by the upper end of the piston and projecting above said casing and having an opening formed therein extending through one side of the upper extension, a lower reduced extension formed integral with the lower end of the piston and provided at its free end with an enlarged head, an annular elastic compressible valve element surrounding the lower reduced extension and held in place by said enlarged head and adapted to engage the shoulder and cover the opening in the shoulder, a split ring rotatably mounted within the annular groove for circumferential adjustment therein, means to draw the ends of the split ring inwardly to clamp the ring to the casing, upstanding knuckles carried by the ends of the split ring, and a lever arranged between the knuckles and pivotally and removably connected therewith and having its end extending into the opening of the upper extension.

THOMAS E. CROCKETT.

REFERENCES CITED

The following references are of record in the file of this patent:

UNITED STATES PATENTS

| Number | Name | Date |
|---|---|---|
| 1,055,778 | Meyer | Mar. 11, 1913 |
| 1,059,490 | Schulte | Apr. 22, 1913 |
| 1,265,670 | Kaier | May 7, 1918 |
| 1,525,247 | Leiss | Feb. 3, 1925 |
| 1,525,334 | Stengel | Feb. 3, 1925 |
| 1,538,144 | Stucky | May 19, 1925 |
| 1,888,378 | Esnard | Nov. 22, 1932 |